United States Patent
Chen et al.

(10) Patent No.: US 7,676,357 B2
(45) Date of Patent: Mar. 9, 2010

(54) ENHANCED CHINESE CHARACTER/PIN YIN/ENGLISH TRANSLATOR

(75) Inventors: Yen-Fu Chen, Austin, TX (US); John W. Dunsmoir, Round Rock, TX (US); Hari Shankar, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 11/060,359

(22) Filed: Feb. 17, 2005

(65) Prior Publication Data

US 2006/0184352 A1 Aug. 17, 2006

(51) Int. Cl.
*G06F 17/28* (2006.01)
(52) U.S. Cl. .......... 704/3; 704/2; 704/4; 704/8; 704/270.1; 704/277; 709/206; 709/217; 715/259; 715/703; 434/156
(58) Field of Classification Search ........... 704/270.1, 704/8, 4, 277, 2; 709/217, 206; 715/259, 715/703; 434/156
See application file for complete search history.

(56) References Cited

U.S. PATENT DOCUMENTS

| | | | | |
|---|---|---|---|---|
| 5,321,607 A * | 6/1994 | Fukumochi et al. | ............ | 704/4 |
| 5,490,061 A * | 2/1996 | Tolin et al. | ............ | 704/2 |
| 5,541,837 A * | 7/1996 | Fushimoto | ............ | 704/2 |
| 5,583,761 A | 12/1996 | Chou | ............ | 395/798 |
| 5,608,622 A * | 3/1997 | Church | ............ | 704/3 |
| 5,832,478 A * | 11/1998 | George | ............ | 707/3 |
| 5,835,924 A * | 11/1998 | Maruyama et al. | ............ | 715/264 |
| 5,974,372 A * | 10/1999 | Barnes et al. | ............ | 704/8 |
| 5,983,169 A * | 11/1999 | Kozma | ............ | 704/2 |
| 6,073,146 A * | 6/2000 | Chen | ............ | 715/264 |
| 6,094,666 A * | 7/2000 | Li | ............ | 715/263 |
| 6,192,332 B1 * | 2/2001 | Golding | ............ | 704/2 |
| 6,243,713 B1 * | 6/2001 | Nelson et al. | ............ | 707/104.1 |
| 6,275,789 B1 * | 8/2001 | Moser et al. | ............ | 704/7 |
| 6,381,567 B1 | 4/2002 | Christensen et al. | ............ | 704/89 |
| 6,393,389 B1 * | 5/2002 | Chanod et al. | ............ | 704/7 |
| 6,567,973 B1 | 5/2003 | Yamamoto et al. | ............ | 717/136 |
| 6,993,473 B2 * | 1/2006 | Cartus | ............ | 704/2 |
| 6,999,916 B2 * | 2/2006 | Lin et al. | ............ | 704/8 |
| 7,065,484 B2 * | 6/2006 | Low et al. | ............ | 704/8 |
| 7,085,707 B2 * | 8/2006 | Milner | ............ | 704/5 |
| 7,099,944 B1 * | 8/2006 | Anschutz et al. | ............ | 709/227 |
| 7,165,019 B1 * | 1/2007 | Lee et al. | ............ | 704/2 |
| 7,194,411 B2 * | 3/2007 | Slotznick et al. | ............ | 704/271 |
| 7,228,269 B2 * | 6/2007 | Xun | ............ | 704/4 |
| 7,389,223 B2 * | 6/2008 | Atkin et al. | ............ | 704/8 |
| 2002/0152258 A1 * | 10/2002 | Zhou | ............ | 709/201 |
| 2002/0194300 A1 * | 12/2002 | Lin et al. | ............ | 709/217 |
| 2004/0078204 A1 * | 4/2004 | Segond et al. | ............ | 704/277 |
| 2004/0205671 A1 * | 10/2004 | Sukehiro et al. | ............ | 715/532 |

(Continued)

*Primary Examiner*—Richemond Dorvil
*Assistant Examiner*—Michael C Colucci
(74) *Attorney, Agent, or Firm*—Yee & Associates, P.C.; William H. Steinberg; Rudolf O. Siegesmund

(57) ABSTRACT

A method for the rapid, dynamic conversion of PinYin words is disclosed. The present invention comprises a web-based computer program. The user identifies an input which may be a hybrid or unaccented Pin Yin word. The character is translated dynamically into an accented Pin Yin word, a Simplified Chinese character or a Traditional Chinese character. The translated character is then displayed. The translation is done in the web page without a round trip to the server.

15 Claims, 2 Drawing Sheets

U.S. PATENT DOCUMENTS

| | | | |
|---|---|---|---|
| 2005/0289168 A1* | 12/2005 | Green et al. | 707/101 |
| 2006/0072143 A1* | 4/2006 | Wilson | 358/1.15 |
| 2006/0080083 A1* | 4/2006 | Lin et al. | 704/8 |
| 2006/0133585 A1* | 6/2006 | Daigle et al. | 379/88.06 |
| 2006/0209276 A1* | 9/2006 | Smith et al. | 355/52 |
| 2006/0265652 A1* | 11/2006 | Seitz et al. | 715/703 |
| 2007/0129932 A1* | 6/2007 | Chen et al. | 704/2 |
| 2007/0136334 A1* | 6/2007 | Schleppenbach et al. | 707/101 |
| 2007/0208813 A1* | 9/2007 | Blagsvedt et al. | 709/206 |
| 2007/0269775 A1* | 11/2007 | Andreev et al. | 434/156 |

* cited by examiner

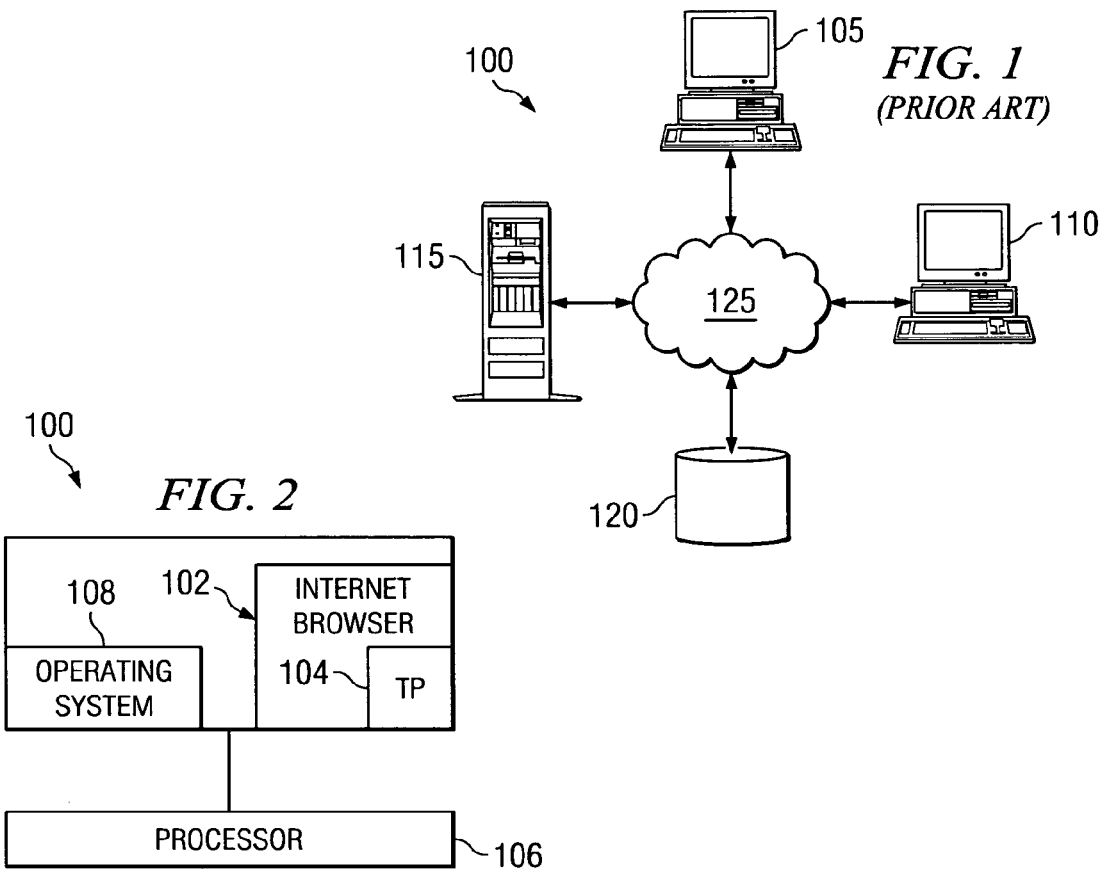
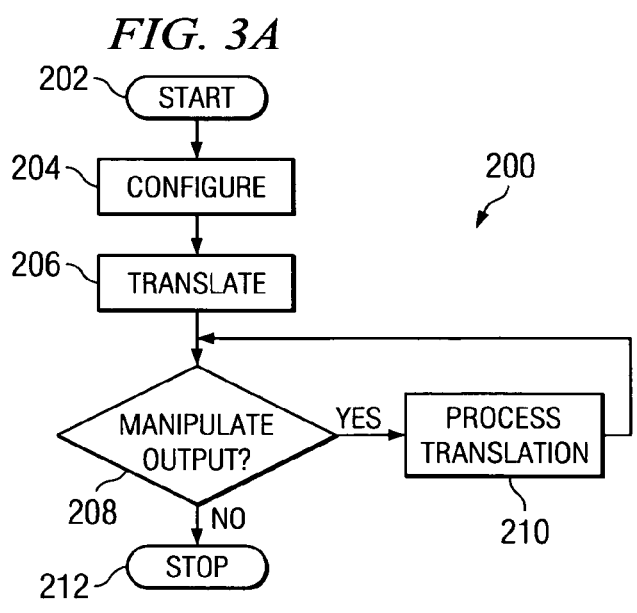
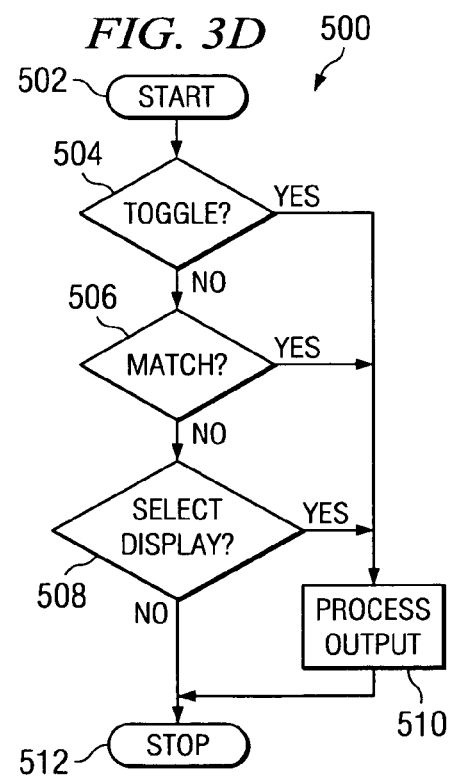

ENHANCED CHINESE CHARACTER/PIN YIN/ENGLISH TRANSLATOR

CROSS-REFERENCE TO RELATED APPLICATION

The present invention is related to the subject matter of U.S. patent application Ser. No. 10/617,526, "Chinese Character/Pin Yin/English Translator," incorporated herein by reference.

FIELD OF THE INVENTION

The present invention is directed to a method for translating from hybrid and unaccented Pin Yin words to Simplified Chinese characters, Traditional Chinese characters, and accented Pin Yin words using a translator program adapted for integration with an existing web browser.

BACKGROUND OF THE INVENTION

Sino-Tibetan based languages, such as Chinese, are vastly different from Latin based languages such as English. The Chinese language does not contain an alphabet. Instead, the Chinese language comprises more than 60,000 individual characters. Each character possesses a meaning, unlike letters of the alphabet, and a sound. Each Chinese character also has one of five fundamental tones or inflections. Tone is fundamental to the language. For example, the character whose sound is "ma" can either mean "mother" or "horse" or a "question" depending on the tone Chinese also differs from Latin based languages in the concept of a word. In Chinese, strings of characters do not contain spaces and the interpretation of where one word ends and another starts is entirely based on context. Chinese characters generally retain their meaning when combined with others in a word. If a Chinese character has characters added to it in a string, the meaning of the first character is enhanced, but normally it is not radically change.

The Peoples' Republic of China (PRC or mainland China) introduced "Pin Yin," a phonetic version of Chinese to help young children learn the language. Pin Yin uses the 26 letters of the English alphabet to indicate the sound of a character. For example, a character can be represented by letters "ma." The tone is represented by 4 accents over certain vowels, or the absence of an accent. The accented vowels indicate the proper tone and are essential to proper pronunciation of Pin Yin. One technique for inputting Pin Yin that uses only the ASCII characters is based on adding a number after the Pin Yin word to indicate the accent as illustrated in Table 1.

TABLE 1

| Number | Accent | Description | Examples |
|---|---|---|---|
| 1 | ¯ | Level Tone | ā ē ī ō ū |
| 2 | ´ | Rising Tone | á é í ó ú |
| 3 | ˇ | Falling Tone, then Rising Tone | ǎ ě ǐ ǒ ǔ |
| 4 | ` | Falling Tone | à è ì ò ù |
| 5 | (None) | No Change in Tone | a e i o u |

Thus, the word guó is input as guo2, the word mā as ma1, and so forth.

A method for translating between Simplified Chinese characters, Traditional Chinese characters, Pin Yin words, and English words was disclosed in U.S. patent application Ser. No. 10/617,526, entitled "Chinese Character/Pin Yin/English Translator," incorporated herein by reference. The software embodiment of the invention is a computer program which takes hybrid or unaccented Pin Yin input and produces as output a combination of accented Pin Yin, Simplified Chinese characters, and Traditional Chinese characters.

When Pin Yin is entered into a web page, it is necessary to place a numeral corresponding to the accent after the letters to indicate the accent. Currently the letters and numeral are translated into the accented form by Java® at the server, requiring a round trip to the server for the translation to be completed. What is needed beyond the prior art is a system and method to (1) perform the conversion process dynamically so that the translated Pin Yin including accents appear immediately without a round trip to the server, (2) to examine every character entered and to automatically change the text after the entry of each character is completed, and (3) to provide usability features to support learning and also to support making decisions when ambiguities are encountered.

SUMMARY OF THE INVENTION

The invention which meets the needs identified above is a system and method for the rapid, dynamic conversion of Pin Yin words entered by a user in a web page input field, or displayed in a web page and identified as input by a user. The software embodiment of the present invention is a translator program adapted for operable integration with an existing web browser so that translation may take place in a displayed web page. Input may be entered by entry into an input field, or by selection of words displayed in a web page. Once input is entered, the translator program then determines if the input constitutes a hybrid or unaccented Pin Yin word. If so, the computer program translates the input, as requested by a user, into a Traditional Chinese character, a Simplified Chinese character, or an accented Pin Yin word. The computer program is rapid and dynamic. It updates the translation after the input of each additional Pin Yin word. The translation is done in the web page without a round trip to the server. An embodiment of the invention provides a very rapid tool for the entry of Chinese. The user enters hybrid or unaccented Pin Yin words, and the computer program translates into Chinese characters. When the user types a period, to indicate the end of a sentence, the computer program takes sentence context into account to refine the translation or to ask the user to select among alternate translations.

These and other objects of the invention will be apparent to those skilled in the art from the following detailed description of a preferred embodiment of the invention.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 1 is an illustration of a computer network used to implement the present invention;

FIG. 2 is an illustration of the memory used to implement the present invention;

FIG. 3A is an illustration of the overall logic of the Translator Program (TP) of the present invention;

FIG. 3D is an illustration of the logic of the process output state of the Translator Program (TP) of the present invention.

DETAILED DESCRIPTION OF THE PREFERRED EMBODIMENT

Figure 3B:
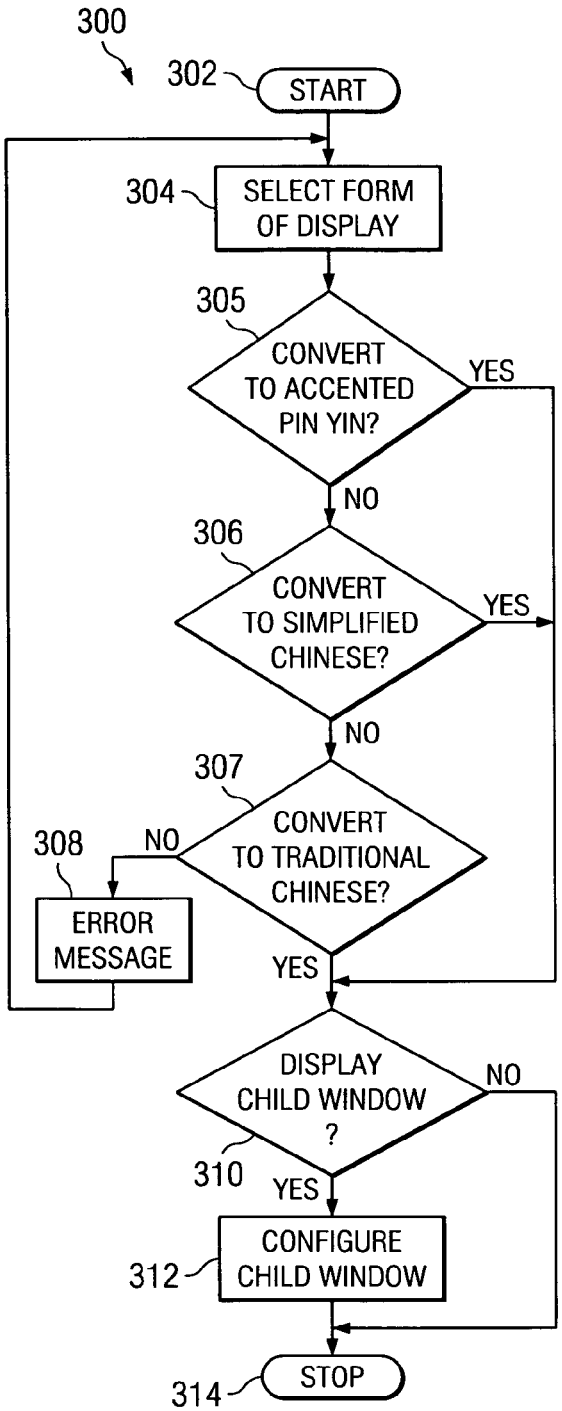
FIG. 3B is an illustration of the logic of the user configuration state of the Translator Program (TP) of the present invention.

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Translator Program (TP)"

Additionally, the Translator Program (TP) is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Translator Program (TP) 104 typically is stored in a memory, represented schematically as memory 100 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 100. As depicted in FIG. 2, though, memory 100 may include additional data and programs. Of particular import to Translator Program (TP) 104, memory 100 includes Internet Browser Program 102 and operating system (OS) 108 with which TP 104 interacts.

As used herein, the term "accented Pin Yin" means the Pin Yin phonetic version of the Chinese language with proper accents over the appropriate Roman letters. As used herein, the term "hybrid Pin Yin" means the Pin Yin phonetic version of the Chinese language without proper accents over the appropriate Roman letters, but instead with numbers in or at the end of the word to represent the accent marks. As used herein, the term "unaccented Pin Yin" means the Pin Yin phonetic version of the Chinese language without proper accents over the appropriate Roman letters. As used herein, "translation" or "translating" means conversion from hybrid Pin Yin, unaccented Pin Yin, or accented Pin Yin into traditional Chinese characters or Simplified Chinese characters, and vice versa, and conversion from unaccented or hybrid Pin Yin into accented Pin Yin, and vice versa.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by the Internet browser 102, which executes the Pin Yin Translator Program (TP) 104. TP 104 can be in the form of Java Script executed by an Internet browser, in the form of a plug-in to an Internet browser, in the form of a Java program executed by an Internet browser, or in the form of any other program, routine, subroutine, or thread executed by an Internet browser. TP 104 is adapted for integration with displayed web pages so that it may receive input identified on a displayed web page. As part of the present invention, the memory 100 can be configured with the Internet browser 102. Processor 106 can execute the instructions contained in TP 104. Further configurations of TP 104 across various Internet browsers are known by persons skilled in the art.

In the preferred embodiment, TP 104 is a set of computer instructions which translates between hybrid or unaccented Pin Yin and Simplified Chinese characters, Traditional Chinese characters or accented Pin Yin, and that is adapted for integration with an existing Internet browser. TP 104 comprises a Navigation Program (NP) 200, a Display Configuration Program (DCP) 300, Language Conversion Program (LCP) 400, and Process Configuration Program (PCP) 500. Flowcharts of the logic of these TP 104 components are illustrated in FIG. 3A, FIG. 3B, FIG. 3C and FIG. 3D.

Navigation Program (NP) 200 is illustrated in FIG. 3A. NP 200 starts (202) when the user accesses the web page. The user may choose to run Display Configuration Program (DCP) 300 (204) (see FIG. 3B). DCP 300 allows the user to select the type of web page to be used for input identification, and to choose the form of Chinese to be output and how the output will be displayed. The user may choose Language Conversion Program (LCP) 400 (206) (see FIG. 3C). LCP 400 accepts Pin Yin input from the user, converts the Pin Yin input to the form of Chinese selected in DCP 300, and displays the output. The user may choose to manipulate the output (208) from LCP 400 using Process Configuration Program (PCP) 500 (see FIG. 3D). If not, NP 200 stops (212).

FIG. 3B depicts a flow chart of DCP 300. DCP 300 starts (302) and the user selects the form of display (304). The user may choose a web page provided by TP 104, or the user may choose to use any existing web page for which TP 104 is adapted to receive identified input. Next, the user can choose to have LCP 400 convert from unaccented or hybrid Pin Yin to accented Pin Yin (305). In that case, LCP 400 converts only the intonation mark and not the entire character. This configuration allows beginners to Chinese to become more familiar with Pin Yin, and with the correct intonation marks of words. Alternatively, the user can choose conversion into Simplified Chinese characters (306) or into Traditional Chinese characters (307). If none of the foregoing selections is made, then an error message is displayed (308) and DCP 300 returns to step 304. Next, the user chooses whether to generate a child window for an additional display relating to the currently translated Chinese characters (310). If the user chooses to have the additional display, the user configures the child window (312). The user can choose to have the characters displayed in traditional format, from top to bottom and right to left, or in modern format, from left to right and top to bottom.

Figure 3C:
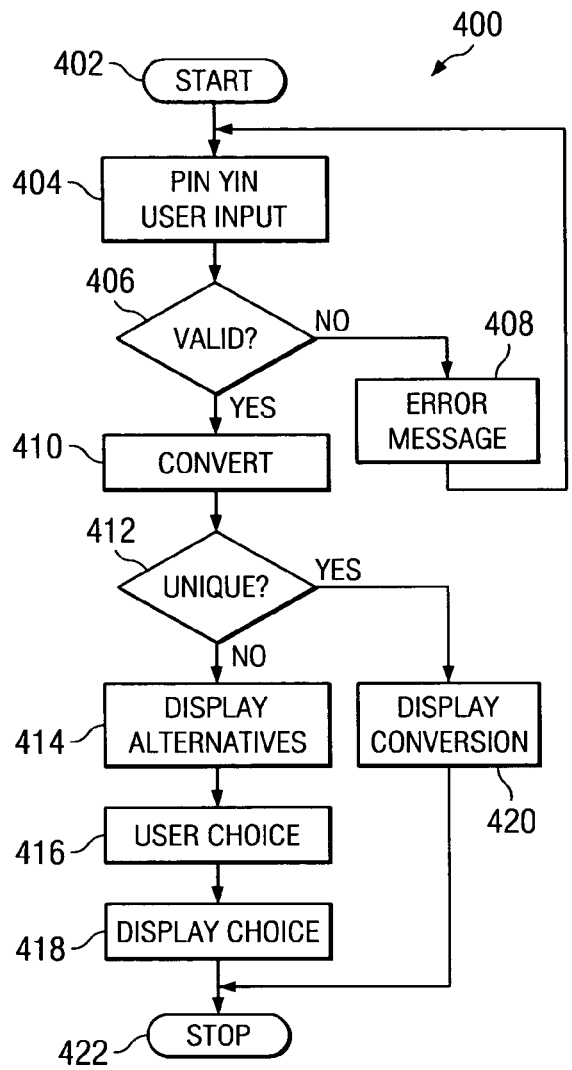
FIG. 3C is an illustration of the logic of the Pin Yin translation phase of the Translator Program (TP) of the present invention.

FIG. 3C depicts a flowchart of LCP 400. LCP 400 starts (402) and the user performs input identification (404). Input may be identified by the user in one of two ways. First, the user may enter input into an existing input field in a displayed web page using an existing input device such as a keyboard. In the first method of entering input, the user may use the translator program's own web page, or the user may use an input field on any displayed web page. Second, the user may highlight words on a displayed web page. As used herein, the term "input identification" means using a designated cursor movement or a designated user action to trigger application of language conversion. One example of a specified movement is highlighting from right to left. Therefore, if an input is typed into an input field, the input may be highlighted from right to left to trigger application of language conversion. Correspondingly, where a desired input is already displayed on a web page, a user may highlight the displayed characters from right to left to trigger language conversion. Persons skilled in the art will be aware of a variety of different cursor movements or user actions suitable for specification as a trigger to activate language conversion. The Pin Yin input can be a hybrid or unaccented Pin Yin word, or a period to indicate the end of a sentence. LCP 400 checks the input (406). If the input is an invalid Pin Yin word, LCP 400 displays an error message (408) and LCP 400 returns to step 404, waiting for additional input. If the input is a valid Pin Yin word, LCP 400 converts the character into another form and displays the translation (410). The translation can be from hybrid or unaccented Pin Yin to accented Pin Yin, Simplified Chinese or Traditional Chinese. LCP 400 can apply context or word logic to determine the proper conversion. LCP 400 can take adjacent characters into account and make use of dictionaries. If the input is a period, indicating the end of a sentence, LCP 400 again uses context or word logic to achieve a conversion. Next, LCP 400 determines whether the conversion is unique (412). As used herein, "unique" means that there is only one possible conversion. If conversion is unique, LCP 400 displays the conversion (420). If the input has multiple possible conversions, LCP 400 displays the alternatives (414). If alternatives are displayed to the user, the user chooses one (416) and LCP 400 displays the chosen alternative (418) A limited subset of Chinese characters, perhaps 3,000 to 5,000 would be suitable for the disambiguation of most characters. In this embodiment of the invention, character disambiguation is performed at the end of each sentence. In an alternate embodiment of the invention, the user may resolve any ambiguity character by character. In the alternate embodiment, all of the disambiguation is performed by LCP 400. In a further alternate embodiment of the invention, server 115 uses dictionaries to disambiguate at the end of a sentence thereby limiting the number of round trips over Internet 125 between server 115 and the user's computer.

FIG. 3D depicts a flow chart of PCP 500. PCP 500 starts (502), and the user chooses to manipulate the output produced by LCP 400. The user may choose to toggle between the original and the newly displayed character by highlighting (504). For example, LCP 400 may be configured so that when text is highlighted by moving the cursor from right to left over an original text, JavaScript® will detect the highlight event, and the original text will replaced by the translated character. Correspondingly, when the cursor is moved from left to right over the translated character, JavaScript® detects the highlight event, and the original text will reappear. The user may choose a match feature where LCP 400 is integrated with a match capability using a backend dictionary (506). If the user selects the match capability, the user may select a character or characters, and search for words containing those characters. The user can perform a search based on a modified character, freezing the other characters already displayed. For example, if three characters are being displayed, the user can freeze the first and third characters, change the second character, and then perform a search. The user does not have to delete the third character and the second character, and replace both. One method of freezing would be to highlight the group of three characters and then to change one of the characters. The user may choose to display characters selected by the user from the LCP 400 output in a child or side window (508). Based on the foregoing selections, the user may process (manipulate) the output (510). The user may select the characters in the output by highlighting them, or by inserting a specified delimiter. In the latter case, all characters on one side of the delimiter are displayed in the child or side window. A newline ASCII character can serve as the delimiter. At the option of the user, these selected characters can either replace the characters already on display in the child or side window, or they can be in addition to the characters already on display there. In the latter case, many display arrangements are possible. They can be shown on a new line, or inserted at the end of the current display.

The present invention provides a very fast, effective method for inputting Chinese. It is fast, because not much time is spent on going back and forth to the server. Most of the work is done on the local computer. It is effective. The user sees each accented Pin Yin word or Chinese character as he enters the Pin Yin equivalent, and has considerable flexibility in modifying the output as desired. Further, the use of word context to disambiguate allows the timesaving use of entry of unaccented Pin Yin to produce the desired Chinese characters. The interactive nature of the invention greatly enhances usability, and improves learning time for students of the language. They can see the Chinese or accented Pin Yin words immediately after they enter their input.

Other embodiments of the invention apply to other languages with a similar structure. An embodiment of the language accepts the Zhu Yin input of traditional Chinese, and produces traditional Chinese characters. More generally, other embodiments of the invention apply for the rapid, interactive entry of generalized computer structures, when the structures have components that can be described with keyboard characters. In these other embodiments of the invention, the user inputs the keyboard characters corresponding to components. The components are then displayed, one component at a time, rapidly and interactively. The user can also manipulate the output, replacing or rearranging components, to produce the desired structures.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A browser based method for converting an unaccented Pin Yin Chinese word into an alternative form, comprising:
   loading a browser based computer program, and a Chinese character dictionary, into a computer memory;
   using the browser based computer program, identifying an unaccented Pin Yin Chinese word on a web page by highlighting the unaccented Pin Yin Chinese word from left to fight;
   responsive only to highlighting the unaccented Pin Yin Chinese word, and using the Chinese character dictionary without accessing an external server, automatically translating the unaccented Pin Yin Chinese word into one or more of an alternative form of the unaccented Pin Yin Chinese word comprising: an accented Pin Yin word, a Traditional Chinese character, and a Simplified Chinese character; and
   displaying the alternative form of the unaccented Pin Yin Chinese word on the web page, wherein the unaccented Pin Yin Chinese word is converted to an alternate form of the unaccented Pin Yin Chinese word on the web page without a round trip to a server; and
   toggling between an original input word and a translation of the input word in response to a first highlighting from left to fight of the original input word and a second highlighting from right to left of the translation.

2. The method of claim 1 further comprising: using a word context to refine the translation.

3. The method of claim 2 further comprising: using a word context to refine the translation after an additional input.

4. The method of claim 3, wherein the additional input is a modified character from a group and the group is frozen except for the modified character.

5. The method of claim 2 further comprising: responsive to an entry of a period to indicate an end of a sentence, automatically using a word context to refine the translation.

6. The method of claim 2 further comprising: displaying an alternative translation to the user when there is an ambiguity, and displaying a translation selected by the user from a plurality of alternatives provided to the user.

7. The method of claim 1 further comprising: generating an additional window to display a second form of translation.

8. The method of claim 7 further comprising: updating a content of the additional window in response to an input from a user.

9. The method of claim 7 further comprising: displaying in the additional window a character selected by a user from the original translation.

10. The method of claim 7 further comprising: giving the user an option of whether a character identified by the user and displayed in the additional window replaces a character being displayed in the additional window or is in addition to the character being displayed in the additional window.

11. The method of claim 7 further comprising: displaying in the additional window all characters on a selected side of a delimiter, wherein the delimiter is placed by the user on a display of characters of an original translation.

12. The method of claim 7, wherein the original translation and the second form of translation consist of a plurality of Chinese characters, and the user is given a choice of direction of the second form of translation between a traditional format and a left to right, top to bottom format.

13. The method of claim 1 further comprising: searching a dictionary for words matching a plurality of selected Chinese characters.

14. The method of claim 13 wherein the plurality of selected Chinese characters used for the search need not be consecutive.

15. A browser based method for converting a plurality of Pin Yin Chinese words into one or more Chinese characters in a user selected format, comprising:
   loading a browser based computer program, and a Chinese character dictionary, into a computer memory;
   using the browser based computer program, inputting a plurality of unaccented Pin Yin Chinese words into a web page, converting the unaccented Pin Yin Chinese words to the accented Pin Yin form, and displaying the accented Pin Yin Chinese word on a first window on a display;
   generating a second window on the display;
   using the Chinese character dictionary, and without accessing an external server, translating the plurality of Pin Yin Chinese words into one or more translated Chinese characters in a form comprising: a Traditional Chinese character, and a Simplified Chinese character;
   displaying the translated Chinese character in the second window;
   placing a user selected delimiter on a display of characters of a first form of the translated Chinese character;
   updating a content of the second window with a second form of the translated Chinese character in response to an input from a user; and
   toggling between an original input word and a translation of the input word in response to a first highlighting from left to right of the original input word and a second highlighting from right to left of the translation;
   wherein the user is given a choice of direction of the second form of the translated Chinese character between a traditional format, and a left to right, top to bottom format;
   wherein the plurality of Pin Yin Chinese words are converted to Chinese characters on the web page in a user selected format without a round trip to a server.

* * * * *